(12) United States Patent
Marstorp (10) Patent No.: US 12,516,748 B2
(45) Date of Patent: Jan. 6, 2026

(54) VALVE HANDWHEEL AND A VALVE ARRANGEMENT COMPRISING SUCH A VALVE HANDWHEEL

(71) Applicant: IMI HYDRONIC ENGINEERING INTERNATIONAL SA, Eysins (CH)

(72) Inventor: Leif Marstorp, Ulricehamn (SE)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 4 days.

(21) Appl. No.: 18/688,426

(22) PCT Filed: Sep. 8, 2022

(86) PCT No.: PCT/EP2022/074953
§ 371 (c)(1),
(2) Date: Mar. 1, 2024

(87) PCT Pub. No.: WO2023/052074
PCT Pub. Date: Apr. 6, 2023

(65) Prior Publication Data
US 2024/0369155 A1 Nov. 7, 2024

(30) Foreign Application Priority Data
Sep. 30, 2021 (EP) .................................. 21200070

(51) Int. Cl.
*F16K 31/60* (2006.01)
*F16K 37/00* (2006.01)

(52) U.S. Cl.
CPC ........ *F16K 31/607* (2013.01); *F16K 37/0058* (2013.01)

(58) Field of Classification Search
CPC ........................... F16K 31/607; F16K 37/0058
See application file for complete search history.

(56) References Cited

U.S. PATENT DOCUMENTS 3,450,091 A * 6/1969 Wajdik .................. G06M 1/045
74/436
5,535,698 A * 7/1996 Trevisan ............. F16K 37/0008
40/473
(Continued)

FOREIGN PATENT DOCUMENTS

DE 9003195 U1 5/1990
EP 1900986 A1 3/2008
WO 2008043362 A1 4/2008

OTHER PUBLICATIONS

European Search Report issued in corresponding Application No. EP 21 20 0070 dated Mar. 16, 2022.
(Continued)

*Primary Examiner* — Angelisa L. Hicks
(74) *Attorney, Agent, or Firm* — Buchanan Ingersoll & Rooney PC (57) ABSTRACT

The invention relates to a valve handwheel, comprising a first handwheel part comprising a first position-indicating window, a second handwheel part comprising a second position-indicating window, and a geometrical centre axis extending through the first and second handwheel parts. The first handwheel part is rotatably connected to the second handwheel part. When a user turns the first handwheel part around said geometrical centre axis, the first position-indicating window rotates with the first handwheel part while the second position-indicating window remains stationary with the second handwheel part. The invention also relates to a valve arrangement comprising such a valve handwheel.

11 Claims, 8 Drawing Sheets

(56) References Cited

U.S. PATENT DOCUMENTS

| | | | | |
|---|---|---|---|---|
| 5,769,118 | A * | 6/1998 | Lenberg | G05G 1/10 |
| | | | | 137/553 |
| 6,547,159 | B1 * | 4/2003 | Westby | B05B 15/60 |
| | | | | 285/148.18 |
| 2016/0153581 | A1 * | 6/2016 | Giubertoni | F16K 31/60 |
| | | | | 137/553 |
| 2020/0408330 | A1 * | 12/2020 | Takeda | F16K 37/0008 |

OTHER PUBLICATIONS

International Search Report (PCT/ISA/210) and Written Opinion (PCT/ISA/237) mailed on Dec. 16, 2022, by the European Patent Office as the International Searching Authority for International Application No. PCT/EP2022/074953.

* cited by examiner

VALVE HANDWHEEL AND A VALVE ARRANGEMENT COMPRISING SUCH A VALVE HANDWHEEL

CROSS-REFERENCE TO RELATED APPLICATIONS

The present application is the U.S. national stage application of International Patent Application No. PCT/EP2022/074953, filed on Sep. 8, 2022, which is related to and claims the benefit of priority to EP Application Serial No. 21200070.7, filed on Sep. 30, 2021, the entire contents of each being incorporated herein by reference.

TECHNICAL FIELD

The present invention relates to a valve handwheel. The present invention also relates to a valve arrangement comprising such a valve handwheel.

BACKGROUND ART

Fluid distribution systems (e.g. hydronic systems), for e.g. heating, cooling and water supply are designed to feed a fluid from a source to a consumption point. Each consumption point typically has a calculated and designed flow or differential pressure requirement. However, depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves and balancing valves are frequently used in fluid distribution systems and have a variable opening such that the flow rates can be controlled. Hereby, the flow fed to the consumption point may be varied in an effective manner.

A valve typically controls the flow by a flow adjustment arrangement. The flow adjustment arrangement comprises a closing member, such as e.g. a valve plug, and a closing member receiving portion, such as e.g. a seat arranged to receive the closing member. According to another example, the valve may be a ball valve in which the closing member is shaped as a ball, which is arranged to rotate and shift its position relative the closing member receiving portion, and thereby change the opening degree of the flow adjustment arrangement.

In some valves, the flow adjustment arrangement can be controlled by means of a handwheel which is operatively connected to the closing member. When an operator rotates the handwheel in one direction, the closing member is moved to reduce the fluid flow through the flow adjustment arrangement, and when the operator rotates the handwheel in the reverse direction, the closing member is moved to increase the fluid flow through the flow adjustment arrangement.

An example of such a handwheel is shown in WO 2008/043362 A1. The handwheel is provided with several read positions pointing in different directions in which read positions the same position symbol is displayed. By providing multiple read positions, it may facilitate for a user to read the current position of the closing member. For example, if the valve is located near the floor, it may be convenient for a user to view the read position at the top of the handwheel. On the other hand, if the valve with its handwheel has been mounted in a location close to a ceiling or close to some other object which prevents or makes it difficult to view the read position at the top of the handwheel, then the user may still have visual access to one of the read positions located on the side of the handwheel, thus enabling the user to obtain the relevant information about the current position of the closing member.

Although the handwheel of WO 2008/043362 A1 is advantageous in that multiple read positions give a certain flexibility, this is unfortunately not always good enough. In certain locations, such as in high corners, not only will an operator fail to see the top of the handwheel, but in certain rotational orientations of the handwheel the read positions on the side will become aligned with the obstructing vertical walls of the corner as well, and only the area between the spaced apart read positions will be visible to a user. Of course, apart from the example with the high corners, there may be other installation locations having visually obstructing objects so that a user really only has one line of sight to choose from. Since the read positions of the handwheel move when the handwheel is rotated, the read positions will move out of sight periodically, making it cumbersome not only to read but also to accurately adjust the flow regulating arrangement to a desired fluid flow. A solution to this problem would of course be to provide even more read positions around the handwheel to reduce the "blind" areas. However, that would require more and larger components, making the handwheel bulkier and more complex.

In view of the above, there is still a need for improvement with respect to the readability of valve handwheels.

SUMMARY OF THE INVENTION

An object of the present disclosure is to provide a valve handwheel which at least partly alleviates the drawbacks of the prior art. This and other objects, which will become apparent in the following, are accomplished by a valve handwheel as defined in the independent claim 1. Some advantageous exemplary embodiments are presented in the dependent claims and in the rest of this disclosure. The term exemplary is in the present context to be understood as serving as an instance, example or illustration.

The general inventive concept is based on the realization that by rotationally decoupling a first position-indicating window from a second position-indicating window, it is possible to arrange one of the position-indicating windows in a fixed line of sight, while the other position-indicating window may be rotated. In particular, the inventor has realized that by providing a first handwheel part which can be rotated while a second handwheel part remains stationary (each one having a respective position-indicating window), then at the time of installation of the valve handwheel, it can be oriented such that the position-indicating window on the second handwheel part is in the desired line of sight, irrespective of the rotational orientation of the first handwheel part. In this way the benefit of having more than one read position is maintained, while also reducing the risk of "blind" areas in the line of sight in certain mounting locations. Furthermore, an additional advantage is that a user does not have to switch focus with his/her eyes when adjusting the valve closing member with the handwheel, since the second-position indicating window is fixed. If the second-position indicating window would be movable as in the prior art, a user would need to switch focus between windows as they moves out of site. Thus, with the present inventive concept it is easier for a user's eye to follow the progress of symbols displayed through the second position-indicating window.

According to a first aspect of the present disclosure, there is provided a valve handwheel, comprising:
- a first handwheel part comprising a first position-indicating window,
- a second handwheel part comprising a second position-indicating window,
- a geometrical centre axis extending through the first and second handwheel parts, wherein the first handwheel part is rotatably connected to the second handwheel part,
wherein the first handwheel part comprises a grip portion for enabling a user to turn the first handwheel part around said geometrical centre axis while the second handwheel part remains stationary relative to said geometrical centre axis, such that the first position-indicating window rotates with the first handwheel part while the second position-indicating window remains stationary with the second handwheel part.

By having a stationary position-indicating window, its position can be aligned according to a desired line of sight in mounting locations where the visibility options are limited, while still presenting the option of a viewing another position-indicating window (for example on top of the valve handwheel) in other mounting locations where viewing that other position-indicating window may be more convenient.

It should be understood that in this disclosure the term "window" should not be limited to be construed as a single viewing area surrounded by defining edge portions. Rather, similarly to ordinary windows in houses and other locations, where the window may have window grilles which divide the window into two or more window panes, the position-indicating window similarly have one or more "window panes" separated by a strip of material ("grille"). For instance, in case the symbols that are shown are numbers, such as number of turns, then one "window pane" of the position-indicating window may show integer numbers while another one may show decimal numbers.

It should also be understood that the grip portion of the first handwheel part is not limited to any specific shape. Rather, it is the functionality that matters. In other words, the grip portion should allow a user to conveniently turn the first handwheel part. For example, the grip portion may be completely cylindrical, such as with a smooth surface, a roughened surface, plastic or material surface, etc. Other exemplary shapes may include horns/projections which extend radially outwardly from a central area.

In at least some exemplary embodiments, it may be conceivable that the second handwheel part is configured to be connectable to a valve body (or a valve bonnet) in any rotational orientation, thus allowing the person installing the valve to freely rotate the second handwheel part into a desired position before that position is fixed, for example by a tightening screw or clamping mechanism. However, to promote the stationary orientation, it may be advantageous to provide an interlocking interface (e.g. rather than risking that a tightening screw is loosened). This is reflected in the following exemplary embodiment.

Thus, according to at least one exemplary embodiment, the valve handwheel is configured to be connectable to a valve having a valve body or valve bonnet, wherein the second handwheel part comprises a locking portion configured to interface, in one of a plurality of selectable rotational orientations, with an anti-rotational portion of the valve body or valve bonnet for maintaining the second handwheel part stationary in the selected rotational orientation. Such plurality of selectable rotational orientations may, for example, be achieved by means of interlocking projections and recesses, or by mating polygonal interfaces. Although a plurality of selectable rotational orientations is advantageous as it, in addition to the rotational locking, still gives a freedom of selection of a suitably rotational orientation for the person installing the valve, in other exemplary embodiments it is conceivable to just have a single selectable rotational orientation. Nevertheless, if such a valve, having a single-orientation interface, is installed in a location with limited line of sight, then the installing person should think about how he/she orients the valve when connecting it to upstream and downstream fluid pipes. More specifically, the installing person should then orient the valve body (valve bonnet) in such way that when the second handwheel part is connected in the single rotational orientation it will be in the available line of sight. In this single-orientation case, it may even be a good idea to connect the second handwheel part to the valve body (or valve bonnet) before the valve is installed between the fluid pipes.

According to at least one exemplary embodiment, one of said locking portion and said anti-rotational portion is provided with at least one indexing element, such as a protrusion or recess/slit, along its circumference for mating with corresponding indexing elements in the other one of said locking portion and said anti-rotational portion, in one of said plurality of selectable rotational orientations. For instance, the locking portion of the second handwheel part may have only one indexing element, for example a recess or a slit, while the anti-rotational portion is provided with a plurality of indexing elements, for example projections, with which the single indexing element can mate. The opposite is of course also possible, i.e. a single indexing element in the anti-rotational portion and a plurality of indexing elements in the locking portion. It may, however, be advantageous to have a plurality of indexing elements in both the locking portion and the anti-rotational portions as this may further strengthen the connection.

As already mentioned above, other conceivable interfaces may include polygonal shapes, such as hexagonal, octagonal, etc. The corners of the male component (for example the anti-rotational portion) may be regarded as indexing elements in the form of projections, while the mating internal corners of the female component (for example the locking portion of the second handwheel part) may be regarded as indexing elements in the form of recesses.

The number of available selectable rotational orientations will normally depend on the component having the largest number of indexing elements. As an example the number of selectable positions may be three, four or higher. For instance, the interface may resemble a gear interface with interconnecting teeth, and may provide a multitude of rotational orientations. As an example, if there are 72 teeth distributed around at least one of the interfacing components, then this allows a user to select 72 different rotational orientations at 5° intervals (360°/72=5°).

According to at least one exemplary embodiment, the valve handwheel further comprises:
- first and second indicator areas provided with positional symbols, such as numbers, which are sequentially displayable through the first and second position-indicating windows, respectively, wherein the first indicator area is stationary in relation to the second handwheel part and viewable through the first position-indicating window such that subsequent symbols become visible through the first position-indicating window as the first handwheel part is turned around said geometrical centre axis, wherein the second indicator area is stationary in relation to the first handwheel part and viewable through the second position-indicating window such that subsequent symbols become visible through the second position-indicating window as the first handwheel part is turned around said geometrical centre axis.

By having one indicator area stationary relative to one of the handwheel parts, the relative movement of the other handwheel part with its window enables the sequential displaying of positional symbols.

Suitably, the first indicator area may be located at a top surface of the second handwheel part, i.e. at an end which is opposite to the end configured to be brought into connection with a valve body or valve bonnet. The first indicator area may, suitably, be circular. For instance it may be provided with equally distributed symbols, such as digits and/or line marks.

Suitably, the second indicator area may be located at an enveloping surface or outer periphery of the first handwheel part, facing radially away from the geometrical centre axis. The second indicator area may, suitably be circular. For instance, it may be provided with equally distributed symbols, such as digits and/or line marks.

According to at least one exemplary embodiment, the same symbol of the first and second indicator areas is simultaneously displayed through the first and second position-indicating windows, respectively, such as displaying tenths and/or hundredths of a full turn. Thus, a user should be able to see the same symbol regardless of which one of the first and second position-indicating windows he/she is viewing.

According to at least one exemplary embodiment, the valve handwheel further comprises:
 a first indicator wheel provided with positional symbols, such as numbers, which are sequentially displayable through the first position-indicating window,
 a first engagement element which is stationary relative to the second handwheel part,
wherein the first indicator wheel is aligned with the first position indicating-window and is connected to the first handwheel part so as to follow the movements of the first handwheel part around said geometrical centre axis,
wherein when the first engagement element becomes engaged with and is passed by the first indicator wheel, then the first indicator wheel is caused to move clockwise or anticlockwise around its own axis so as to display a subsequent symbol through the first position-indicating window.

By having a first indicator wheel which follows the first window's path around the geometrical centre axis, and a first engagement element which is stationary relative to the geometrical centre axis, the number of turns may be counted and displayed in an efficient manner. Suitably the symbols of the first indicator wheel are viewable together with the symbols of the first indicator area through the first position-indicating window. In its path around the geometrical centre axis the first indicator wheel may suitably move along and around the periphery of the first indicator area. The symbols of the first indicator wheel may suitably be facing in a direction parallel to the geometrical centre axis. Similarly, the symbols of the first indicator area may suitably face in a direction parallel to the geometrical centre axis.

From the above it should be understood that the first indicator wheel is suitably movable around two axis. On the one hand it follows the movement of the first handwheel part around the geometrical centre axis. On the other hand for each lap the first engagement element causes a small rotary and momentary movement with respect to the first indicator wheel's own centre axis. The first indicator wheel's own centre axis is suitably parallel to said geometrical centre axis of the valve handwheel.

According to at least one exemplary embodiment, the valve handwheel further comprises:
 a second indicator wheel provided with positional symbols, such as numbers, which are sequentially displayable through the second position-indicating window,
 a second engagement element which is connected to the first handwheel part so as to follow the movements of the first handwheel part around said geometrical centre axis,
wherein the second indicator wheel is aligned with the second position indicating-window and is connected to the second handwheel part,
wherein when the second engagement element becomes engaged with and passes the second indicator wheel, then the second indicator wheel is caused to move clockwise or anticlockwise around its own axis so as to display a subsequent symbol through the second position-indicating window.

By having a second indicator wheel which is stationary relative to the geometrical centre axis so as to stay viewable through the second position indicating-window, and a second engagement element which follows the first handwheel part's path around the geometrical centre axis, the number of turns may be counted and displayed in an efficient manner. Suitably the symbols of the second indicator wheel are viewable together with the symbols of the second indicated area through the second position-indicating window. In its path around the geometrical centre axis the second indicator area may suitably have its periphery (inner or outer periphery) move along the second indicator wheel. The symbols of the second indicator wheel may suitably be facing in a direction perpendicular to the geometrical centre axis and away from the geometrical centre axis. Similarly, the symbols of the second indicator area may suitably be facing in directions perpendicular to the geometrical centre axis and away from the geometrical centre axis. In other words, the symbols of the second indicator area may suitably be facing in radial directions.

From the above it should be understood that although the second indicator wheel is stationary with respect to the geometrical centre axis, for each lap of the second engagement element there will be a small rotary and momentary movement with respect to the second indicator wheel's own centre axis. The second indicator wheel's own centre axis is suitably perpendicular to said geometrical centre axis of the valve handwheel.

According to at least one exemplary embodiment, the same symbol of the first and second indicator wheels is simultaneously displayed through the first and second position-indicating windows, respectively, such as displaying number of full turns.

According to at least one exemplary embodiment, the first position-indicating window is located at the top of the first handwheel part and is facing in a direction parallel to said central geometrical axis. Thus, a user should be able to see the same symbol regardless of which one of the first and second position-indicating windows he/she is viewing.

As already understood from above, according to at least one exemplary embodiment, the second position-indicating window is facing radially away from said central geometrical axis, and is suitably located in a cylindrical portion of the second handwheel part. If a valve and the valve handwheel needs to be mounted in a location where it will be difficult to view the top of the valve handwheel, it is advantageous to have the second position-indicating window facing radially, facilitating for the installer to install the valve handwheel such that at least the second position-indicating window will be viewable.

According to a second aspect of the present disclosure, there is provided a valve arrangement. The valve arrangement comprises:
- a valve body housing a valve closing member for regulating a fluid flow through the valve body, and
- a valve handwheel according to the first aspect (including any embodiment thereof), wherein the second handwheel part is configured to interface with an anti-rotational portion of the valve body or a valve bonnet associated with the valve body, for maintaining the second handwheel part stationary in a selected rotational orientation.
wherein the first handwheel part is connectable to a valve rod which is operatively connected to the valve closing member, such that turning of the first handwheel part is transferred by the valve rod into an opening or closing movement of the valve closing member.

The advantages of the valve arrangement according to the second aspect are largely analogous to the advantages of the valve handwheel of the first aspect, including any embodiments thereof.

It should be understood that historically in some valve arrangements, the handwheels have been connected directly to a valve body, while in other valve arrangements the handwheels have been connected to a valve bonnet mounted to the valve body. The valve handwheel of the present disclosure may suitably be used with either type of such valve arrangements. The inventive principle of having the second handwheel part stationary during normal operation, while allowing the first handwheel part to be rotated, can be implemented in connection to either one of a valve body or a valve bonnet.

According to at least one exemplary embodiment, the valve arrangement comprises an extension kit for extending the distance between the valve handwheel and the valve body or valve bonnet, one extension part of the extension kit being configured to be connected between the first handwheel part and the valve rod, another extension part of the extension kit being configured to be connected between the second handwheel part and said anti-rotational portion. As will be explained, this may further increase the readability/visibility of at least one of the position-indicating windows.

It is often desirable to have non-bulky and rather compact valves and thereto connected handwheels. For instance, some installers and users prefer to have a low handwheel which does not project far from the valve body or valve bonnet. However, for certain fluid distribution systems, it may be desirable to provide insulating material not only around the pipes, but also around the valve. This may result in low visibility when trying to read the position of the valve closing member on the handwheel. By providing an extension kit, which may advantageously be used for such installations, the first and suitably also the second position-indicating windows may become clear of the insulating material and thereby visible for reading.

BRIEF DESCRIPTION OF THE DRAWINGS

With reference to the appended drawings, below follows a more detailed description of embodiments of the invention cited as examples.

In the drawings.

DETAILED DESCRIPTION

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

Figure 1:
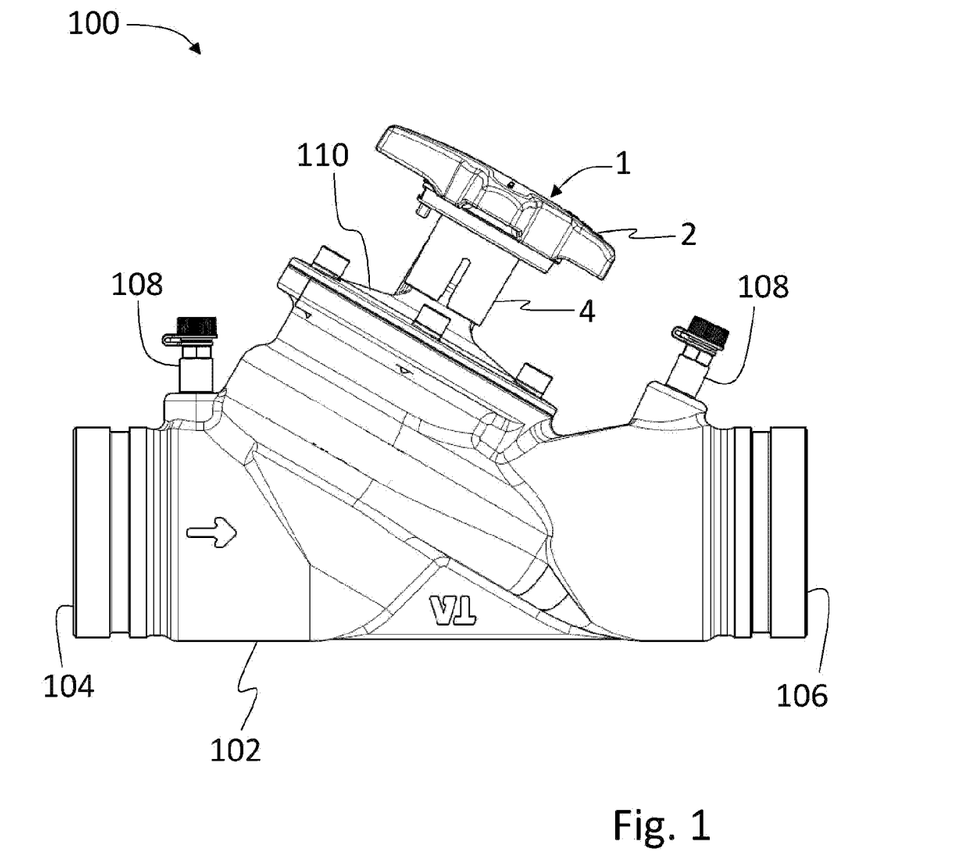
FIG. 1 is an illustration of a valve arrangement in accordance with at least one exemplary embodiment of the present invention.

FIG. 1 is an illustration of a valve arrangement 100 in accordance with at least one exemplary embodiment of the present invention. The valve arrangement 100 comprises a valve having a valve body 102 which is provided with a fluid inlet 104 and a fluid outlet 106. A flow path within the valve is provided to enable fluid to flow from the fluid inlet 104 to the fluid outlet 106. The valve body 102 will be installed such that an upstream pipe of a fluid distribution system is connected to the fluid inlet 104 and a downstream pipe of the fluid distribution system is connected to the fluid outlet 106. In order to regulate the fluid flow form the fluid inlet 104 to the fluid outlet 106, a valve closing member (not shown) is housed within the valve body 102. Movement of the valve closing member regulates the opening area of a section of the flow path between the fluid inlet 104 and the fluid outlet 106. As illustrated in FIG. 1, the valve body 102 may be provided with optional measuring nipples 108 for providing fluid access to the upstream side and downstream side of the valve closing member, enabling measurement of the differential pressure across the valve closing member.

In the illustrated example a valve bonnet 110 is fixed to the valve body 102. In other exemplary embodiments, however, the valve bonnet 110 may be omitted.

The valve arrangement 100 also comprises a valve handwheel 1. In this exemplary embodiment, the valve handwheel 1 is interfacing the valve bonnet 110. However, in other exemplary embodiments, it may interface directly with the valve body 102. The valve handwheel 1 comprises a first handwheel part 2 which is rotationally connected to a second handwheel part 4. It is the second handwheel part 4 that is configured to interface with the valve. In this exemplary embodiment the second handwheel part 4 is configured to interface with the valve bonnet 110 of the valve, in particular with an anti-rotational portion of the valve bonnet 110, for maintaining the second handwheel part 4 stationary in a selected rotational orientation. Thus, the second handwheel part 4 will not rotate relative to the valve bonnet 110 and the valve body 102. The first handwheel part 2, however, is rotatable relative to the valve bonnet 110 and the valve body 102.

In this mounted position of the valve handwheel 1, the first handwheel part 2 has been connected to a valve rod (not shown) which, in its turn, is operatively connected to the valve closing member, such that when the first handwheel part 2 is turned, then the turning motion is transferred by the valve rod into an opening or closing movement of the valve closing member.

Figure 2:
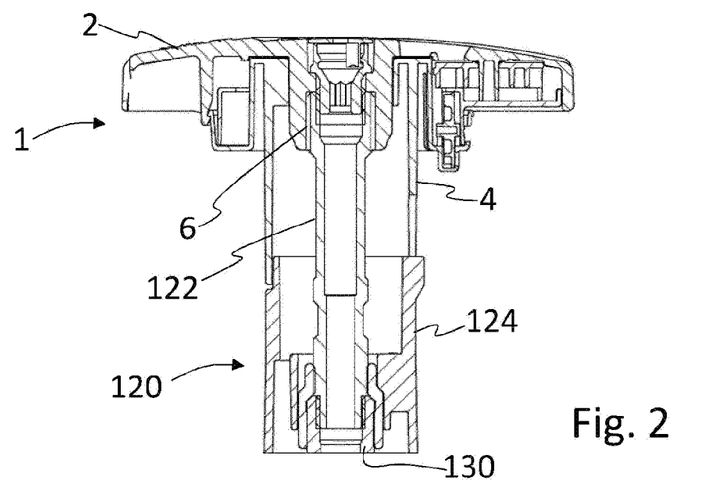
FIG. 2 illustrates an extension kit connected to a valve handwheel in accordance with at least one exemplary embodiment of the present invention.
Figure 3:
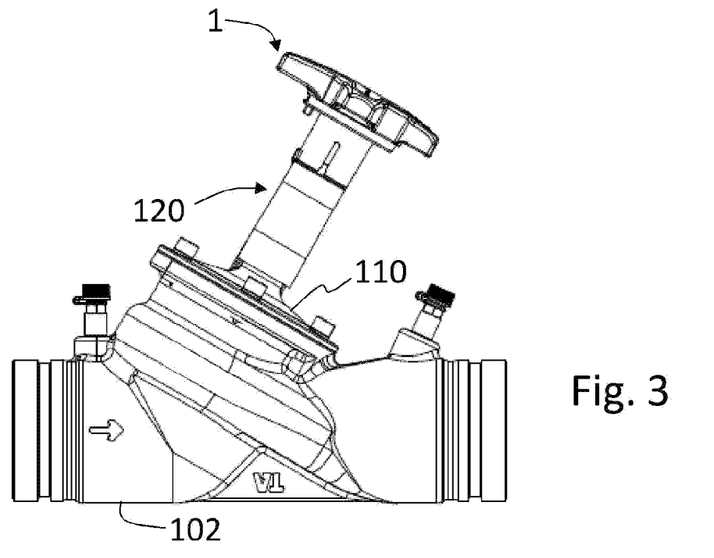
FIG. 3 is an illustration of a valve arrangement which includes the valve handwheel and extension kit of FIG. 2, in accordance with at least one exemplary embodiment of the present invention.
Figure 8:
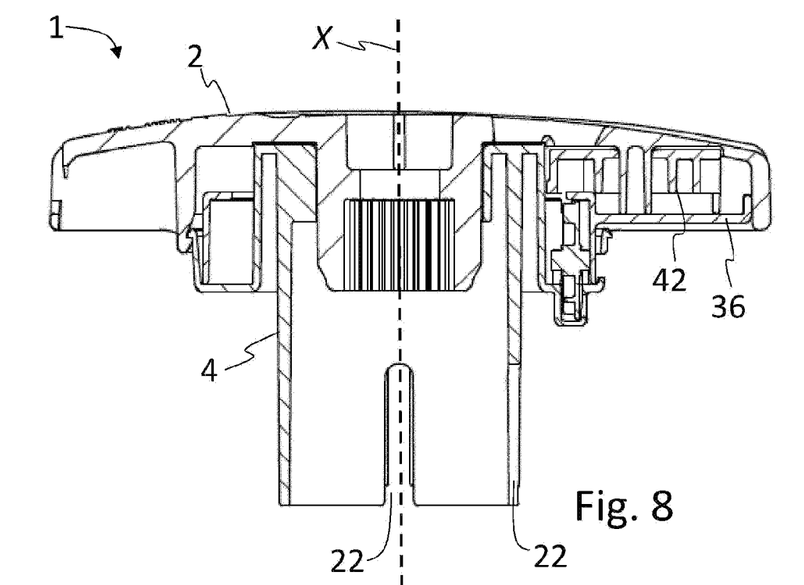
FIG. 8 is a cross-sectional view of the valve handwheel of FIG. 4.

FIG. 2 illustrates an extension kit 120 connected to a valve handwheel 1 in accordance with at least one exemplary embodiment of the present invention. More specifically, FIG. 2 illustrates a cross-section of the extension kit 120 connected to the valve handwheel 1. As a comparison, FIG. 8 illustrates a cross-section of the valve handwheel 1 without the extension kit being connected. The extension kit 120 of FIG. 2 is provided for extending the distance between the valve handwheel 1 and the valve body 102 or valve bonnet 110. For illustrative purposes, the upper end of a connected valve rod 130 is indicated in FIG. 2. FIG. 3 illustrates the valve handwheel 1 with the extension kit 120 of FIG. 2 connected to the valve bonnet 110. This can be compared to the valve arrangement 100 in FIG. 1 where no extension kit is included. As can be seen when comparing FIG. 3 and FIG. 1, the distance of the valve handwheel 1 to the valve bonnet 110 is greater in FIG. 3.

The extension kit 120 is particularly useful under circumstances when insulating material is provided around the valve body 102 and the valve bonnet 110. The extension kit 120 can then lift the valve handwheel 1 to a position outside the insulating material, facilitating both the flow regulation and reading of the position of the valve closing member. The reading of the position of the valve closing member by viewing information displayed on the valve handwheel 1 will be discussed in more detailed in connection with the remaining drawing figures. Continuing now, however, with the disclosure of FIG. 2, it can be seen that the extension kit 120 comprises one extension part 122 that is connected to a valve rod receiving portion 6 of the first handwheel part 2. The other end of this extension part 122 is connected to the valve rod 130 (which in turn is connected to the valve closing member). Thus, a turning motion of the first handwheel part 2 will via said extension part 122 be transferred to the valve rod 130. In installations in which the extension kit 120 is not used, then the valve rod receiving portion 6 would be connected directly to the valve rod 130. The extension kit 120 also comprises another extension part 124 which is connected to the second handwheel part 4. The other end of said another extension part 124 is intended to be connected to said anti-rotational portion of the valve bonnet 110 (or valve body 102). Thus, the second handwheel part 4 will via said another extension part 124 be rotationally locked to the valve bonnet 110 (or valve body 102). It should be understood that the extension kit 120 is an optional feature which may be used at will, depending on the installation circumstances. However, it should also be understood that in line with the advantage of the general inventive concept, the use of the extension kit 120 can also reduce the risk of a line of sight becoming blocked when installed in certain circumstances (e.g. the example of when insulating material is provided around the valve).

Figure 4:
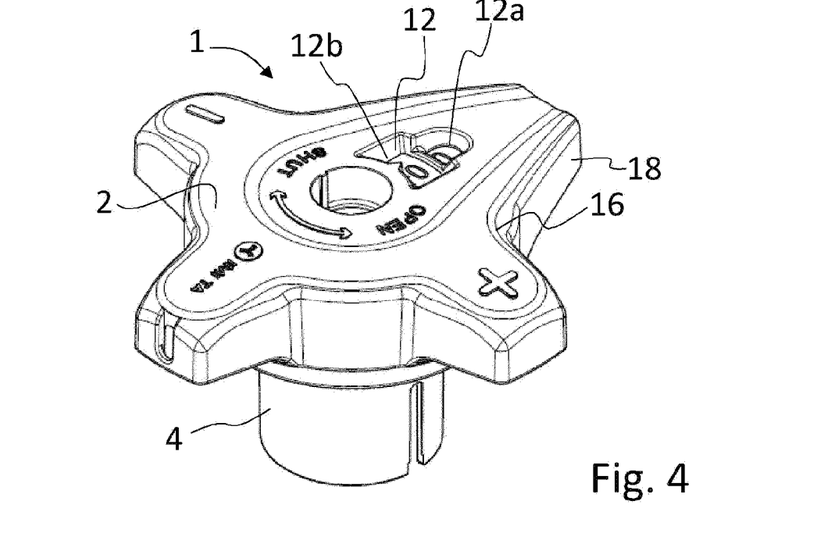
FIG. 4 is a top perspective view of a valve handwheel in accordance with at least one exemplary embodiment of the present invention.
Figure 5:
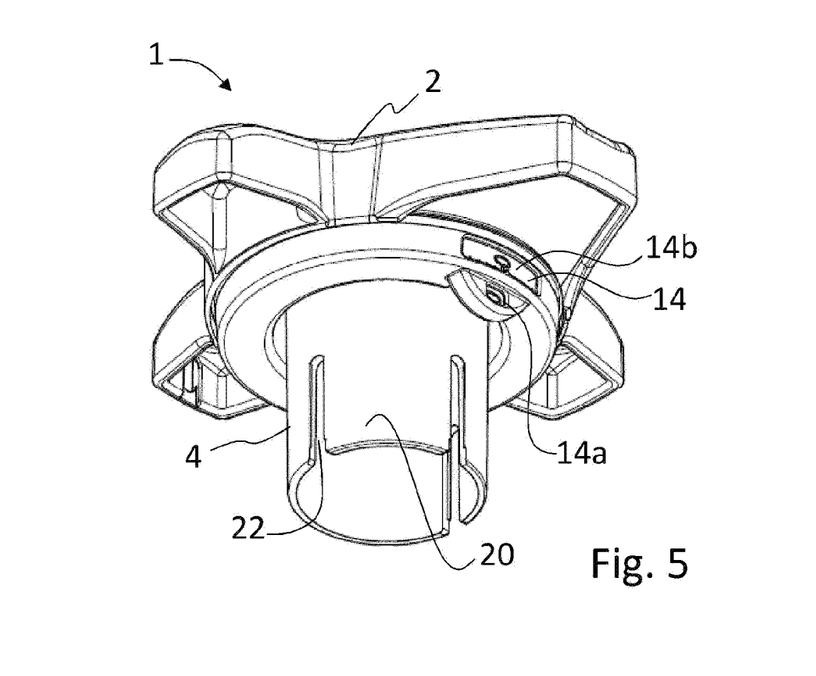
FIG. 5 is a bottom perspective view of the valve handwheel of FIG. 4.

FIG. 4 is a top perspective view of a valve handwheel 1 in accordance with at least one exemplary embodiment of the present invention. Then valve handwheel may suitably be used in the valve arrangements shown in FIGS. 1 and 3. FIG. 5 is a bottom perspective view of the valve handwheel 1 of FIG. 4.

With reference to FIGS. 4 and 5, the valve handwheel 1 comprises a first handwheel part 2 comprising a first position-indicating window 12 and a second handwheel part 4 comprising a second position-indicating window 14. Each one of the first and second position-indicating windows 12, 14 are presented with two window panes 12a, 12b, 14a, 14b. One of the window panes 12a, 14a may suitably indicate the number of full turns, while the other window pane 12b, 14b may suitably indicate decimals of a full turn.

The first position-indicating window 12 is located on top of the valve handwheel 1 and may conveniently be viewed from above in many installation locations. However, in some installation locations, it may not be practically possible to view the valve handwheel 1 from above, but rather along a lateral line of sight, in which case the second position-indicating window 14 is more convenient to view. In order to make sure that the second position-indicating window 14 remains in the desired line of sight, the first handwheel part 2 is rotationally connected to the second handwheel part 4. Thus, when the first handwheel part 2 is rotated, the second handwheel part 4 can remain stationary, i.e. not rotate. Thus, once the second position-indicating window 14 has been properly aligned with the desired line of sight, it will remain there even though the first handwheel part 2 is rotated to regulate the flow through the valve body to which the valve handwheel 1 is attached. This makes it easy for a user to follow the progress of symbols in the second position-indicating window 14, as a user's eyes can stay focused in one location and does not have to switch focus because of read positions moving out of sight as in the prior art.

As indicated in FIG. 8, the valve handwheel 1 also comprises a geometrical centre axis X which extends through the first handwheel part 2 and the second handwheel part 4. From the previous discussion, it should be understood that the first handwheel part 2 can be turned around the geometrical centre axis X while the second handwheel part 4 is kept stationary relative to the geometrical centre axis X.

Turning back to FIG. 4, the first handwheel part 2 comprises a grip portion 16 for enabling a user to turn the first handwheel part 2 around said geometrical centre axis X. Turning of the first handwheel part 2 will cause the first position-indicating window 12 to rotate with the first handwheel part 2, while the second position-indicating window 14 remains stationary with the second handwheel part 4. As mentioned previously in this disclosure, the grip portion 16 may be designed in any suitable way that may be appropriate for a user to hold and turn the first handwheel part. The illustrated projecting horns/wings 18 are thus only illustrative examples which may be omitted.

As mentioned above in relation to FIGS. 1, the valve handwheel 1 may be configured to be connectable to a valve having a valve body 102 or valve bonnet 110. In particular, as best seen in FIG. 5, the second handwheel part 4 may comprise a locking portion 20 configured to interface, in one of a plurality of selectable rotational orientations, with an anti-rotational portion of the valve body 102 or valve bonnet 110, for maintaining the second handwheel part 4 stationary in the selected rotational orientation. For instance, as illustrated in FIG. 5, the locking portion 20 comprises slits 22. In the example shown in FIG. 5 there are three slits 22 illustrated, however, other number of slits are also conceivable. The anti-rotational portion of the valve body or valve bonnet may suitably have mating ribs or the like, to rotationally lock the second handwheel part 4 in one of three selectable rotational orientations. It should be understood that one mating rib in the anti-rotational locking portion would be sufficient for providing rotational locking in any one of the three selectable rotational orientations.

Figure 9:
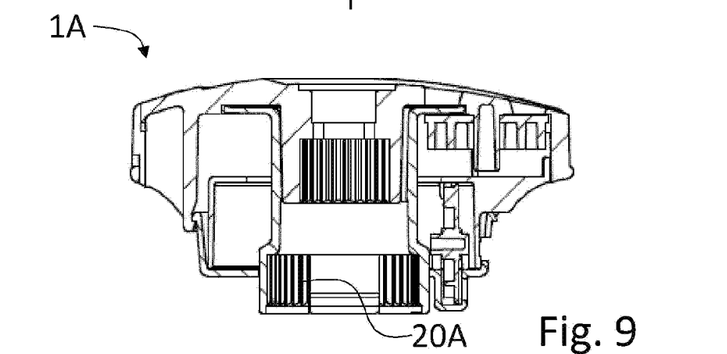
FIG. 9 is a cross-sectional view of a valve handwheel according to at least another exemplary embodiment of the present invention.

It should be understood that the locking portion 20 may be configured in various different manners, as may the mating anti-rotational portion of a valve bonnet 110 or valve body 102. FIG. 8 shows a cross-section of the valve handwheel 1 of FIG. 5, in which two of the slits 22 are visible. FIG. 9 illustrates the cross-section of a valve handwheel 1A according to another exemplary embodiment. FIG. 9 illustrates a locking portion 20A having an internal "gear-shape", with a plurality of teeth which are intended to engage with corresponding mating teeth in an anti-rotational portion of a valve body or valve bonnet. The number of selectable rotational orientations will normally correspond to the number of teeth. The exemplary embodiment of FIG. 9 also illustrates an overall smaller dimension of the valve handwheel 1A than the dimension of the valve handwheel 1 of the exemplary embodiment of FIG. 8.

The slits 22 of the locking portion 20 of FIG. 8 and the teeth of the locking portion 20A of FIG. 9 represent indexing elements, i.e. elements that allow the two components to be placed in selected predetermined rotational orientations relative to each other. Thus, in a general sense, according to at least one exemplary embodiment, one of said locking portion 20, 20A and said anti-rotational portion is provided with at least one indexing element (such as a protrusion, tooth, recess, slit, etc.) along its circumference for mating with corresponding indexing elements in the other one of said locking portion 20, 20A and said anti-rotational portion, in one of said plurality of selectable rotational orientations.

In the following, the positional symbols that are displayed through the first and second position-indicating windows 12, 14 will be discussed. As mentioned, previously, in the illustrated examples, one symbol may be in the form of an integer, representing the number of full turns that the first handwheel part 2 has rotated (for example from a fully closed or fully open position of the valve closing member). Another symbol may, for example, represent parts of (decimals of) a turn. Such double digit displays are illustrated in FIGS. 4, 5, 6 and 7. As perhaps best seen in FIGS. 6 and 7, there may be line marks between the decimals which represent even smaller parts of a turn, typically a hundredth of a full turn between neighbouring line marks. It should be understood that other symbols than the ones exemplified are, of course, also conceivable.

In the present exemplary embodiments, the decimals are provided on what will be referred to as indicator areas, while the integers (full turn digits) are provided on what will be referred to as indicator wheels.

FIGS. 11-15 illustrate different views of some of the components that are included in the valve handwheel 1 of FIG. 4.

Figure 6:
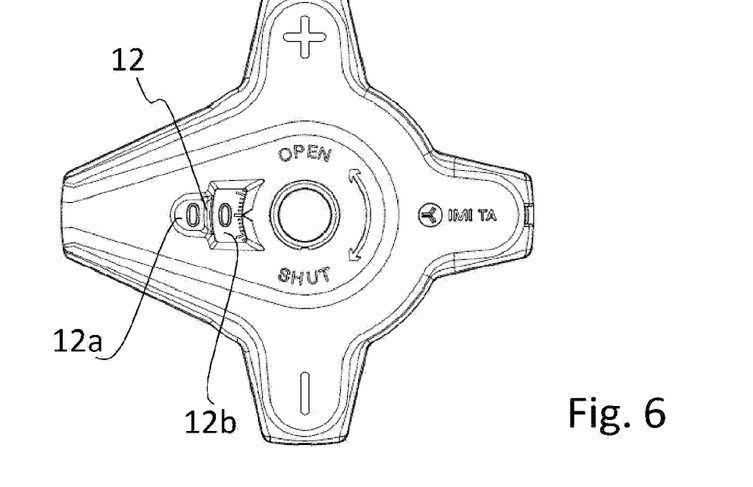
FIG. 6 is a top view of the valve handwheel of FIG. 4.
Figure 11:
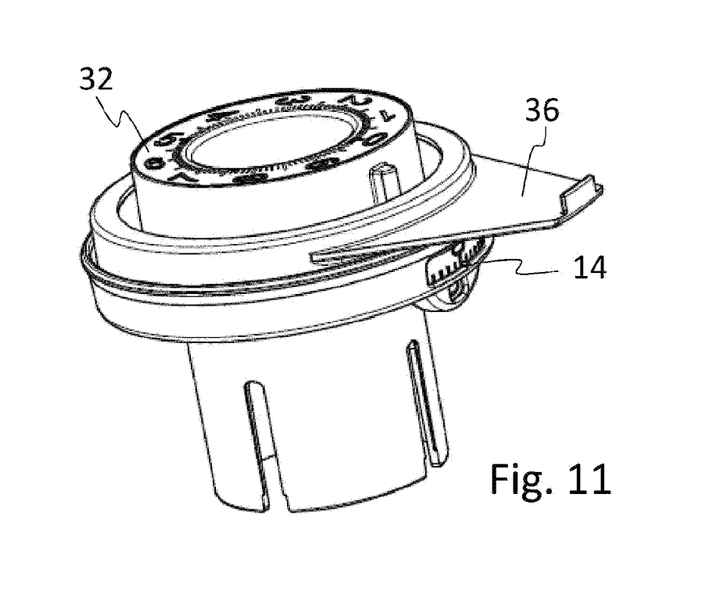
FIGS. 11-15 illustrate different views of some of the components that are included in the valve handwheel of FIG. 4.
Figure 13:
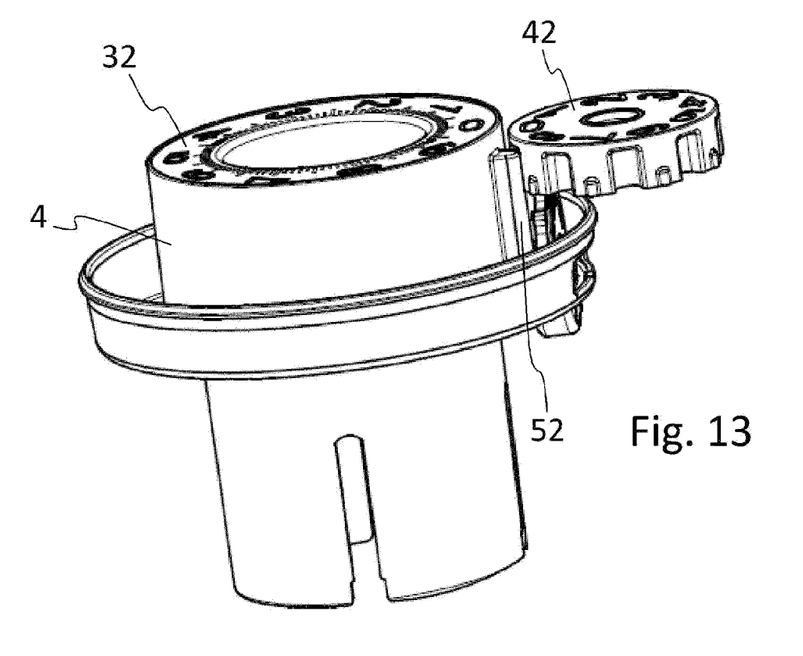
Figure 14:
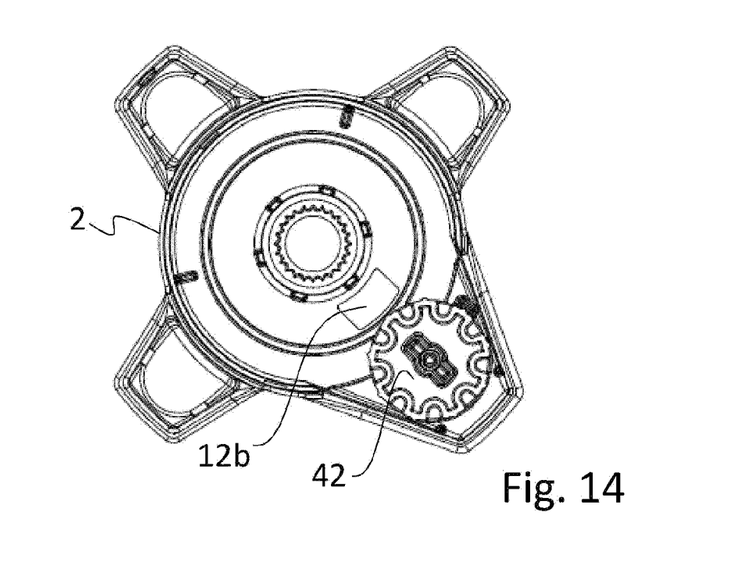
Figure 15:
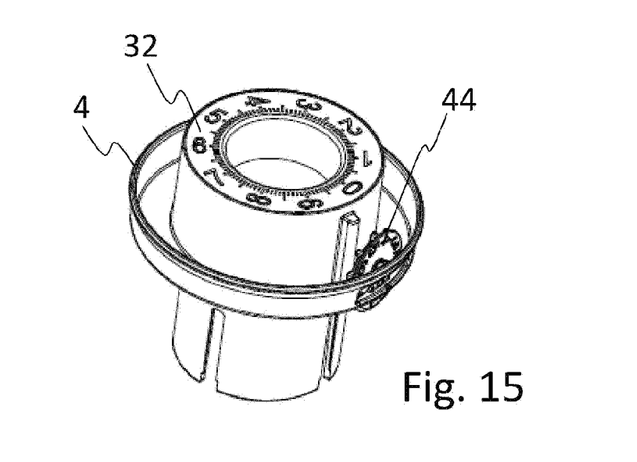

With reference to FIGS. 11, 13 and 15, there is disclosed a first indicator area 32 provided with positional symbols. In this illustration the symbols are numbers, which represent tenths of a full turn, and the numbers being separated by line marks that represent hundredths of a full turn. With reference to FIGS. 14 and 15 it can be seen that FIG. 14 illustrates components of the first handwheel part 2, in a view from below (i.e. as would be seen from the perspective of the second handwheel part 4), while FIG. 15 illustrates a perspective view of components of the second handwheel part 4. In FIG. 14, one of the window panes 12b of the first position-indicating window 12 is shown (from below). The symbols of the first indicator area 32 in FIG. 15 will in the assembled state of the valve handwheel 1 be sequentially displayable through said window pane 12b in FIG. 14. In FIGS. 4 and 6 the currently displayed symbol of the first indicating area 32 is seen in the window pane 12b closest to the centre of the first handwheel part 2 (i.e. the window pane closest to the geometrical centre axis X).

As can be understood from FIG. 15, the first indicator area 32 is stationary in relation to the second handwheel part 4. As the first handwheel part 2 is turned around the geometrical centre axis X, the first position-indicating window 12 (i.e. window pane 12b in FIG. 14) will be moved and thereby symbols will be sequentially displayed through the first-position-indicating window 12.

Figure 7:
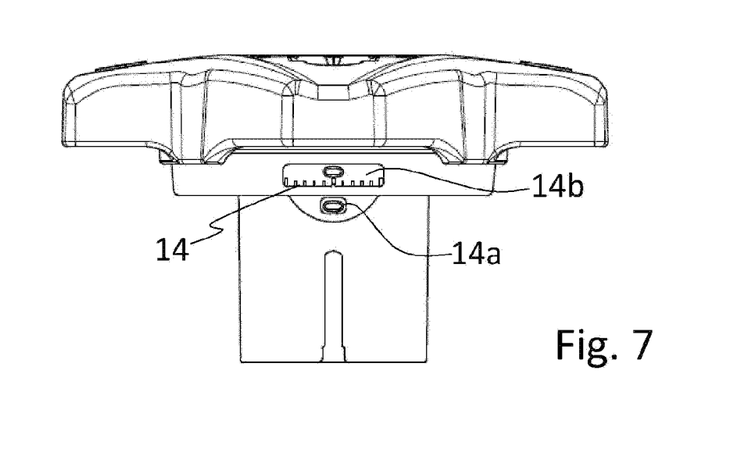
FIG. 7 is a side view of the valve handwheel of FIG. 4.
Figure 12:
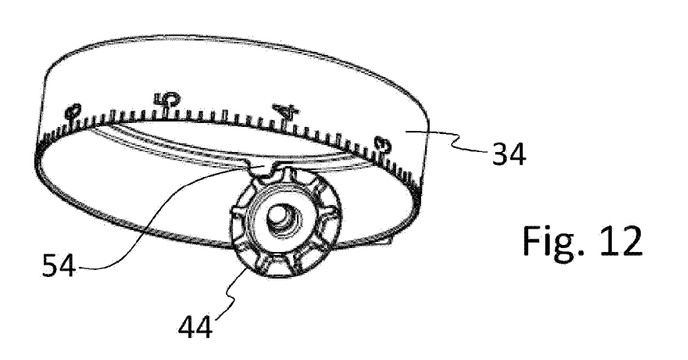

Turning now to FIG. 12, there is illustrated a second indicator area 34 provided with positional symbols (again illustrating tenths and hundredths of a full turn). FIG. 11 shows how a symbol of the second indicator area 34 of FIG. 12 can be seen through the second position-indicating window 14. This is also illustrated by FIGS. 5 and 7. In each one of FIGS. 5, 7 and 11, the currently displayed symbol of the second indicating area 34 is seen in the upper window pane 14b of the second position-indicating window 14, i.e. the window pane 14b of the second position-indicating window 14 located furthest from the locking portion 20 of the second handwheel part 4.

Figure 10:
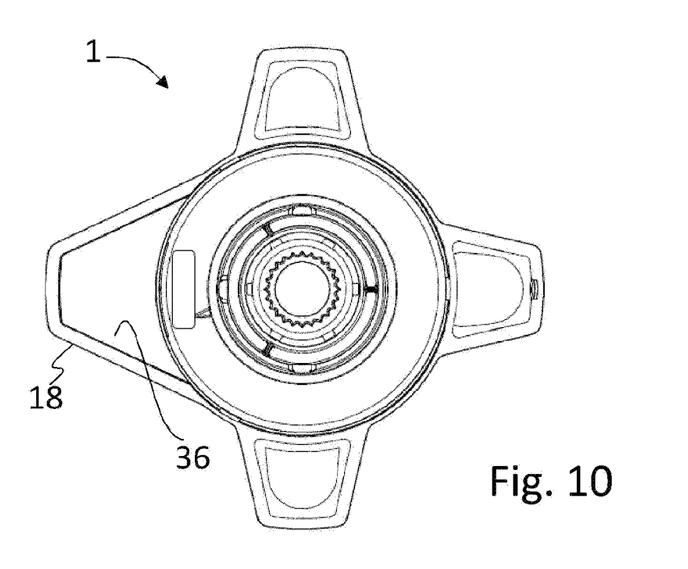
FIG. 10 is a bottom view of the valve handwheel of FIG. 4.

The second indicator area 34 may be provided on a ring portion as illustrated in FIG. 12. That ring portion may suitably, via a plate 36 (see FIG. 11), be engaged with one of the wings/horns 18 of the grip portion of the first handwheel part 2 (see FIG. 10, which is a view of the assembled valve handwheel 1 from below), such that the second indicator area 34 is stationary in relation to the first handwheel part 2. In some exemplary embodiments, the ring portion with second indicator area 34 may be formed in one piece with the plate 36. It should be understood that other suitably ways of making the second indicator area 34 stationary relative to the first handwheel part 2 are also conceivable. In the assembled state of the valve handwheel 1, when the first handwheel part 2 is turned by a user, the second indicator area 34 will follow the motion of the first handwheel part 2 and thereby the symbols of the second indicator area 34 will be sequentially displayed through the second position-indicating window 14 (in the illustrated examples through window pane 14b).

Suitably, the same symbol of the first indicator area 32 is displayed through the first position-indicating window 12 as the symbol of the second indicator area 34 displayed through the second position-indicating window 14. Thus, a user should appropriately be presented with the same information regardless of which one of the position-indicating windows 12, 14 that he/she is looking at. (In theory, it is of course conceivable to have different symbols, for example Arabic numerals in one window and Roman numerals in another.)

In FIG. 13, a first indicator wheel 42 is shown. It is provided with positional symbols. In this exemplary embodiment, the symbols are integers showing the number of full turns that the first handwheel part 2 has been rotated (for example from fully open or fully closed state of the valve closing member). The first indicator wheel 42 can also be seen from below in FIG. 14. Since FIG. 14 is a view from below the window pane 12a through which the symbols of the first indicator wheel 42 are displayed cannot be seen in FIG. 14. Instead, FIGS. 4 and 6 shows that a symbol of the first indicator wheel 42 is displayed through the first position-indicating window 12. More specifically, the symbol is displayed in the window pane 12a that is furthest away from the centre of the first handwheel part 2.

As illustrated in FIG. 13, there is provided a first engagement element 52 which is stationary relative to the second handwheel part 4, and may thus form part of the second handwheel part 4. In the present example, the first engagement element 52 is in the form of a ridge projecting radially from a cylindrical surface of the second handwheel part 4. The first engagement element 52 is configured to become engaged between cogs of the cogwheel shaped first indicator wheel 42. Other configurations of the first engagement element 52 and the first indicator wheel 42 are, of course, conceivable as long as they present the corresponding functionality, namely that the first indicator wheel 42 becomes engaged and moved one step for each turn. Thus, when the first engagement element 52 becomes engaged with and passed by the first indicator wheel 42, then the first indicator wheel 42 is caused to move clockwise or anti-clockwise around its own axis (depending on the direction that a user is turning the first handwheel part 2). Hereby, a subsequent symbol will become displayed through the first position-indicating window 12. It should be understood that, in the assembled state of the valve handwheel 1, the first indicator wheel 42 is aligned with the first position-indicating window 12 and is connected to the first handwheel part 2 so as to follow the movements of the first handwheel part 2 (and the first position-indicating window 12) around said geometrical centre axis X. Thus, the only relative motion between the first indicator wheel 42 and the first position-indicating window 12, occurs when the first engagement element 52 forces the first indicator wheel 42 to move one step around its own axis (i.e. the first indicator wheel axis). The first indicator wheel 42 may suitably be located above the plate 36 illustrated in FIG. 11, and as seen in the cross-sectional view in FIG. 8 of the assembled valve handwheel 1.

It should be noted that the orientation of the first indicator wheel 42 in FIGS. 13 and 14 may be modified. Thus, instead of the illustrated example, in which the axis of the first indicator wheel 42 is parallel with the geometrical centre axis X, in other exemplary embodiments the first indicator wheel 42 may, for instance, be arranged with its axis perpendicular to the geometrical centre axis X. In such exemplary embodiments the symbols could be provided along the circumference of the first indicator wheel 42. The same principle would apply, i.e. a first engagement element 52 would be provided to become engaged with and passed by the first indicator wheel 42.

As best seen in FIGS. 12 and 15, the valve handwheel 1 of the illustrated exemplary embodiment also includes a second indicator wheel 44 provided with positional symbols, corresponding to those of the first indicator wheel 42. The symbols of the second indicator wheel 44 are sequentially displayable through the second position-indicating window 14, as shown in FIGS. 5 and 7. In particular, the symbols of the second indicator wheel 44 are displayed through the lower window pane 14a of the second position-indicating window 14, i.e. the window pane located closest to the locking portion 20 of the second handwheel part 4. The second indicator wheel 44 is connected to the second handwheel part 4 and is aligned with the second position-indicating window 14 (in the illustrated example, with window pane 14a of the second position-indicating window 14).

As best seen in FIG. 12, there is provided a second engagement element 54 (here illustrated as a tab extending from the ring of the first handwheel part which can engage the cogs of the cogwheel shaped second indicator wheel 44). When a user turns the first handwheel part, then for each complete lap, the second engagement element 54 will become engaged with and pass the second indicator wheel 44. This will cause the second indicator wheel 44 to move clockwise or anticlockwise around its own axis so as to display the next symbol through the second position-indicating window 14. It should be understood that the only relative motion between the second indicator wheel 44 and the second position-indicating window 14, occurs when the second engagement element 54 forces the second indicator wheel 44 to move one step around its own axis (i.e. the second indicator wheel axis).

It should be noted that the orientation of the second indicator wheel 44 in FIGS. 12 and 15 may be modified. Thus, instead of the illustrated example, in which the axis of the second indicator wheel 44 is perpendicular to the geometrical centre axis X, in other exemplary embodiments the second indicator wheel 44 may, for instance, be arranged with its axis parallel to the geometrical centre axis X. In such exemplary embodiments the symbols could be provided along the circumference of the second indicator wheel 44. The same principle would apply, i.e. a second engagement element 54 would be provided to become engaged with and passed by the second indicator wheel 44.

From the above explanations it may be understood that the sequential displaying of the symbols of the first and second indicator areas 32, 34 can be made in a stepless manner, while the sequential displaying of the symbols of the first and second indicator wheels 42, 44 can be made in a stepwise manner.

Furthermore, similarly to the above mentioning of showing the same symbol of the first and second indicator areas 32, 34 through the first and second position-indicating windows 12, 14, respectively, the same symbol of the first and second indicator wheel 42, 44 is suitably simultaneously displayed through the first and second position-indicating windows 12, 14, respectively (such as displaying the number of full turns).

As has been illustrated in the drawings the first position indicating window 12 may suitably be located at the top of the first handwheel part 2 and facing in a direction parallel to said central geometrical axis X. Furthermore, the second position-indicating window 14 may suitably be facing radially away from said central geometrical axis X, and may suitably be located in a cylindrical portion of the second handwheel part 4.

As should now be understood from the above disclosure, the present inventive concept has decoupled the traditional valve handwheel into a first handwheel part 2 and a second handwheel part 4, and allows the first handwheel part 2 to be rotated while the second handwheel part 4 is kept still. By providing a first and a second position-indicating window 12, 14 on the respective handwheel part 2, 4, the flexibility of presenting the current position from different lines of sight is maintained, while allowing the orientation of the second position-indicating window 14 to remain unaffected by the turning of the first handwheel part 2. This avoids the risk of the second position-indicating window 14 moving out of sight once installed in the desired rotational orientation.

It is to be understood that the present invention is not limited to the embodiments described above and illustrated in the drawings; rather, the skilled person will recognize that many changes and modifications may be made within the scope of the appended claims. For instance, the illustrated locking portions 20, 20A, the indexing elements 22, etc. can be varied in shape, dimensions and numbers; the grip portion 16 may be designed in numerous different manners; the symbols and the window panes 12a, 12b, 14a, 14b may be varied. Indeed in simpler exemplary embodiments, either the indicator areas 32, 34 or the indicator wheels 42, 44 may be omitted so that only one symbol is illustrated in each position-indicating window 12, 14.

The invention claimed is:

1. A valve handwheel, comprising:
 a first handwheel part comprising a first position-indicating window,
 a second handwheel part comprising a second position-indicating window,
 a geometrical centre axis (X) extending through the first and second handwheel parts,
 wherein the first handwheel part is rotatably connected to the second handwheel part,
 wherein the first handwheel part comprises a grip portion for enabling a user to turn the first handwheel part around said geometrical centre axis (X) while the second handwheel part remains stationary relative to said geometrical centre axis (X), such that the first position-indicating window rotates with the first handwheel part while the second position-indicating window remains stationary with the second handwheel part,
  a first indicator wheel provided with positional symbols, such as numbers, which are sequentially displayable through the first position-indicating window,
  a first engagement element which is stationary relative to the second handwheel part,
 wherein the first indicator wheel is aligned with the first position indicating-window and is connected to the first handwheel part so as to follow the movements of the first handwheel part around said geometrical centre axis (X),
 wherein when the first engagement element becomes engaged with and is passed by the first indicator wheel, then the first indicator wheel is caused to move clockwise or anticlockwise around its own axis so as to display a subsequent symbol through the first position-indicating window.

2. The valve handwheel as claimed in claim 1, wherein the valve handwheel is configured to be connectable to a valve having a valve body or valve bonnet, wherein the second handwheel part comprises a locking portion configured to interface, in one of a plurality of selectable rotational orientations, with an anti-rotational portion of the valve body or valve bonnet for maintaining the second handwheel part stationary in the selected rotational orientation.

3. The valve handwheel as claimed in claim 2, wherein one of said locking portion and said anti-rotational portion is provided with at least one indexing element, such as a protrusion or recess/slits, along its circumference for mating with corresponding indexing elements in the other one of said locking portion and said anti-rotational portion, in one of said plurality of selectable rotational orientations.

4. The valve handwheel as claimed in claim 1, further comprising:
 first and second indicator areas provided with positional symbols, such as numbers, which are sequentially displayable through the first and second position-indicating windows, respectively,
 wherein the first indicator area is stationary in relation to the second handwheel part and viewable through the first position-indicating window such that subsequent symbols become visible through the first position-indicating window as the first handwheel part is turned around said geometrical centre axis (X),
 wherein the second indicator area is stationary in relation to the first handwheel part and viewable through the second position-indicating window such that subsequent symbols become visible through the second position-indicating window as the first handwheel part is turned around said geometrical centre axis (X).

5. The valve handwheel as claimed in claim 4, wherein the same symbol of the first and second indicator areas is simultaneously displayed through the first and second position-indicating windows, respectively, such as displaying tenths and/or hundredths of a full turn.

6. The valve handwheel as claimed in claim 1, further comprising
 a second indicator wheel provided with positional symbols, such as numbers, which are sequentially displayable through the second position-indicating window,
 a second engagement element which is connected to the first handwheel part so as to follow the movements of the first handwheel part around said geometrical centre axis (X),
 wherein the second indicator wheel is aligned with the second position indicating-window and is connected to the second handwheel part,
 wherein when the second engagement element becomes engaged with and passes the second indicator wheel, then the second indicator wheel is caused to move clockwise or anticlockwise around its own axis so as to display a subsequent symbol through the second position-indicating window.

7. The valve handwheel as claimed in claim 6, wherein the same symbol of the first and second indicator wheels is simultaneously displayed through the first and second position-indicating windows, respectively, such as displaying number of full turns.

8. The valve handwheel as claimed in claim 1, wherein the first position-indicating window is located at the top of the first handwheel part and is facing in a direction parallel to said central geometrical axis (X).

9. The valve handwheel as claimed in claim 1, wherein the second position-indicating window is facing radially away from said central geometrical axis (X), and is suitably located in a cylindrical portion of the second handwheel part.

10. A valve arrangement, comprising:
 a valve body housing a valve closing member for regulating a fluid flow through the valve body, and
 the valve handwheel as claimed in claim 1,
 wherein the second handwheel part is configured to interface with an anti-rotational portion of the valve body or a valve bonnet) associated with the valve body, for maintaining the second handwheel part stationary in a selected rotational orientation, wherein the first handwheel part is connectable to a valve rod which is operatively connected to the valve closing member, such that turning of the first handwheel part is transferred by the valve rod into an opening or closing movement of the valve closing member.

11. The valve arrangement as claimed in claim 10, further comprising an extension kit for extending the distance between the valve handwheel and the valve body or valve bonnet, one extension part of the extension kit being configured to be connected between the first handwheel part and the valve rod, another extension part of the extension kit being configured to be connected between the second handwheel part and said anti-rotational portion.

* * * * *